UNITED STATES PATENT OFFICE 2,614,088

EMULSION POLYMERIZATION OF VINYL ACETATE

John E. Bristol, Niagara Falls, and Norris Turnbull, Grand Island, N. Y., assignors to E. I. du Pont de Nemours & Company, Wilmington, Del., a corporation of Delaware No Drawing. Application August 12, 1950, Serial No. 179,094

7 Claims. (Cl. 260—29.6)

This invention relates to the emulsion polymerization of vinyl acetate and more particularly to the preparation of an improved aqueous dispersion of polyvinyl acetate.

Stable aqueous dispersions of polyvinyl acetate ordinarily called "polyvinyl acetate emulsions" are commonly made by dispersing monomeric vinyl acetate in water in the presence of a suitable dispersing agent, generally with the aid of rapid stirring or other suitable agitation and polymerizing the dispersed monomer by the addition of a polymerization catalyst at a suitable temperature or by subjecting it to other polymerizing conditions, for example, by exposure to actinic radiation. The art is replete with a variety of methods for carrying out such emulsion polymerizations to obtain the so-called emulsions which are relatively stable aqueous dispersions of solid polyvinyl acetate existing in the form of very fine particles.

Such vinyl acetate emulsions are useful for a variety of purposes, including adhesive and coating uses. The emulsions, when spread upon a solid surface and permitted to dry, form continuous films which are often transparent. Such films spread between two solid bodies and permitted to dry there form an excellent adhesive bond. For such coating and adhesive uses, the emulsions may be mixed with other ingredients, solid or liquid, to serve as fillers, pigments, reinforcing agents, extenders, plasticizers and solvents. For example, by suitable addition of pigments and solvents, the emulsions may be utilized in water-base paint formations.

In the uses of the polyvinyl acetate emulsions as coatings and adhesives, difficulties have arisen because of the lack of adequate water resistance. The presence of the dispersing agent utilized in making the emulsion, is mainly responsible for the lack of water resistance in films obtained from the emulsion. The dispersing agent tends to cause the redispersion of the polymer, thus imparting to the films the effect of water solubility to a greater or less extent.

Various methods have been proposed heretofore for reducing the water sensitivity of films obtained from polyvinyl acetate emulsions. One method is to treat the film during or after its formation with a substance which chemically reacts with the dispersing agent to destroy its effectiveness as a dispersing agent. In many emulsions which utilize water soluble grades of polyvinyl alcohol as dispersing agents, water sensitivity can be reduced more or less by treating the emulsion during or after a coating process with a material such as an aldehyde or the like which will insolubilize the polyvinyl alcohol, thereby destroying its dispersing activity. Such methods have the disadvantage of requiring additional operational steps such as treating the coated articles or mixing in a treating agent just prior to application of the vinyl resin emulsion. Another method comprises adding to the vinyl resin emulsion materials capable of insolubilizing the polyvinyl alcohol or other dispersing agent to the emulsion. This method has been only partially successful for the reason that generally such reagents tend to react with the dispersing agent while the emulsion is in storage or shipment, thus causing coagulation. It has long been desired to produce a stable polyvinyl acetate emulsion which can be stored and shipped for indefinite periods of time without coagulation and which, on drying at a temperature of 25° C. or higher, form a film which does not redisperse when contacted with water.

An object of this invention is an improved process for the production of polyvinyl acetate emulsions. A further object is to prepare a polyvinyl acetate emulsion, stable during storage and shipment, from which non-redispersible films can be cast without the necessity of chemical or heat treatments. Still other objects of the invention will be apparent from the following description.

The above objects may be attained in accordance with the present invention by the herein described method for polymerizing vinyl acetate. This method depends first upon the use of a completely hydrolyzed grade of polyvinyl alcohol or a soluble starch as the dispersing agent and second upon the utilization of a certain technique in carrying out the polymerization. We have also found it preferable to utilize a certain class of polymerization catalysts hereinafter described, which we term "activated peroxide type catalysts."

In one method for polymerizing vinyl acetate in accordance with our invention, we may first dissolve a completely hydrolyzed grade of polyvinyl alcohol in water to form a solution containing from 4.5 to 6.0% by weight of the polyvinyl alcohol. We then add a small amount of vinyl acetate not exceeding 1.5% to 3% of the weight of the aqueous solution and disperse this by adequate agitation. The catalyst is then added and the dispersion, with continued agitation, is brought to a suitable temperature, for example 82 to 90° C. so as to cause polymerization of the dispersed vinyl acetate. At any time after the polymerization has started, including a time sufficient to completely polymerize the initial quantity of vinyl acetate, further small quantities of vinyl acetate are added, either continuously or intermittently, provided that the amount of vinyl acetate added or the rate of addition of vinyl acetate is such that the amount of vinyl acetate in the reaction mixture never exceeds 5% of the weight of the aqueous portion, so long as the amount of polymer formed does not exceed 20% of the weight of said aqueous portion. When the amount of polymer formed has increased to more than 20% by weight of the aqueous portion, the addition of the vinyl acetate monomer may be increased, if desired, so long as it is then not permitted to exceed 3.0% by weight of the total charge. The process is continued until the amount of polymer formed has reached around 40% by weight of the mixture. As the polymerization progresses, further amounts of catalyst may be added, as required to maintain a suitable catalyst concentration.

The resulting polyvinyl acetate dispersions are latex-like or creamy compositions which yield clear, transparent, substantially water insoluble films of vinyl acetate when spread on solid surfaces and dried at temperatures not below 25° C. We have found that such non-redispersible film-forming emulsions cannot be made (1) by using a partially hydrolyzed grade of polyvinyl alcohol as the emulsifying agent, regardless of the rate of monomer addition nor (2) by using completely hydrolyzed grades of polyvinyl alcohol as emulsifiers when the monomer concentration during polymerization is not maintained as described above.

The invention is further illustrated by the following examples. In these examples the properties of the polyvinyl emulsions noted were determined by the following "characterization procedures," except as otherwise indicated.

*Characterization procedures*

*Particle size.*—The particle size of the emulsion is determined by examination of a highly diluted sample under a microscope equipped with a calibrated scale.

*pH.*—Beckmann pH meter (measured at 25° C.).

*Viscosity.*—The viscosity is determined at 25° C. with a Brookfield viscosimeter, with the spindle rotating at 60 R. P. M. and reported in centipoises (cp.).

*Air-dried film.*—A 0.008" thick wet film is cast on a 7½" x 17" ground glass plate with a Boston Bradley adjustable blade doctor knife. It is placed in a constant temperature room at 72° F. and 72% relative humidity for 24 hours. This film is used for observation of clarity, redispersion and number of oscillations-wet rubs.

*Redispersion.*—Redispersion is noted when the above film is wet with water and rubber with a nylon brush: if the water becomes milky, redispersion is stated to occur.

*Number of oscillations-wet rubs.*—The above-indicated air-dried film is tested according to the Federal Specifications TTP-88a (with the modification that water instead of soap solution is used and no heat treatment of film is permitted) with a Gardner Model 105 washability and abrasion machine. In this test the film is scrubbed with a wet-weighted nylon brush. The number of oscillations of this wet scrubbing is noted when any area of the central 4" section of the film fails. A test of 4000 oscillations or better indicates excellent wet abrasion resistance. The designation "O. K." indicates no observable failure of the film.

*Percent screen test.*—A 100-gram sample of the emulsion is diluted with water to 1000 grams and is run through a weighed 200 mesh per sq. in. screen. The screen is washed until the filtrate is clear. It is then dried in the oven to constant weight. (An emulsion of 0.1% or less screen test on 200 mesh screen is acceptable to most users of polyvinyl acetate emulsions. In many applications, an emulsion with a screen test of 0.2% or greater would have to be screened before use.)

*6% solids dilution settling test.*—The polyvinyl acetate emulsion is diluted with water to 6% solids and 100 cc. of the diluted emulsion is allowed to stand for 24 hours. A reading is taken of the number of cc. of sludge settled out. (This is an indication of dilution stability. An emulsion of less than 2 cc. can be used by most emulsion consumers who apply the emulsion in a dilute form. An emulsion which contains more than 3 cc. of sludge in 100 cc. of 6% solids would be unsatisfactory for dilute application.)

EXAMPLE 1

*Materials*

| | |
|---|---|
| Water | 640 g. |
| Completely hydrolyzed grade of polyvinyl alcohol | 40 g. |
| Sodium bicarbonate | 1.2 g. |
| Vinyl acetate | 460 g. |
| Zinc formaldehyde sulfoxylate solution (8%) | 25.4 cc. |
| Hydrogen peroxide (4%) | 25.2 cc. |

*Polymerization*

The polyvinyl alcohol and sodium bicarbonate were mixed with the water in a vessel fitted with an agitator and reflux condenser. This mixture was then stirred and heated at 85° to 95° for about one hour. Vinyl acetate was slowly added until a mild reflux was obtained (about 1.3% vinyl acetate) to displace oxygen which inhibits polymerization. Hydrogen peroxide (4%) and zinc formaldehyde sulfoxylate (8%) were added, in equal amounts, at a rate which would give a satisfactory polymerization. The vinyl acetate was added at a rate which would maintain a steady reflux with the reactor at 85° to 90° and maintain monomer content within the range of 0.5 to 2% by weight. The polyvinyl acetate emulsion was then cooled to about 25° C. with mild stirring. The polymerization time was about two hours.

*Characterization*

Particle size:
| | |
|---|---|
| Predominant spheres | 0.5 micron |
| Range spheres | 0.2 to 3.0 microns |
| Agglomerates | up to 9.0 microns |
| pH | 4.38 |
| Viscosity | 730 cp. |
| Air-dried film | Clear |
| Redispersion | None |
| Number of oscillations-wet rubs | O. K. at 10,000+ |
| Percent screen test | 0.266% |
| 6% solids dilution settling test | 0.5 cc. |

EXAMPLE 2

Materials

As indicated in Example 1, except for the zinc formaldehyde sulfoxylate and hydrogen peroxide.

|   | Cc. |
|---|---|
| Zinc formaldehyde sulfoxylate solution (4%) | 17.0 |
| Hydrogen peroxide (4%) | 17.0 |

Polymerization

The polymerization was carried out as described in Example 1, using the materials indicated above. The time required for the polymerization was 95 minutes. The temperature of polymerization was 85° to 87° C. rising to 90° C. on completion.

Characterization of emulsion

| | |
|---|---|
| Particle size: | |
|    Predominant spheres | 0.5 micron |
|    Range spheres | 0.2 to 3.0 microns |
|    Agglomerates | up to 10 microns |
| pH | 4.65 |
| Viscosity | 660 cp. |
| Air-dried film | Clear |
| Redispersion | None |
| Number of oscillations—wet rubs | O. K. at 10,000+ |
| Per cent screen test | 0.328% |
| 6% solids dilution settling test | 1.0 cc. |

EXAMPLE 3

Materials

As indicated in Example 2, except for the zinc formaldehyde sulfoxylate and $H_2O_2$.

|   | Cc. |
|---|---|
| Zinc formaldehyde sulfoxylate (4%) | 15.3 |
| Hydrogen peroxide (4%) | 15.3 |

Polymerization

The polymerization was carried out as indicated in Example 2, with the above materials, except that the monomer concentration was 10 to 15% for 90% of the time, finishing at around 3 to 5%. The temperature was 74° to 76° C., rising to 85° C. on completion. The reaction time was about one hour.

Characterization of emulsion

| | |
|---|---|
| Particle size: | |
|    Predominant spheres | 0.75 micron |
|    Range spheres | 0.2 to 3 microns |
|    Agglomerates | up to 33 microns |
| pH | 4.6 cp. |
| Viscosity | 1400 cp. |
| Air-dried film | Cloudy |
| Redispersion | Redisperses |
| Number of oscillations—wet rubs | Failed at 71 |
| Per cent screen test | 2.67% |
| 6% solids dilution settling test | 6.0 cc. |

EXAMPLE 4

Materials

As indicated in Example 2, except $N_2$ atmosphere and:

|   | Cc. |
|---|---|
| Zinc formaldehyde sulfoxylate (4%) | 29.3 |
| Hydrogen peroxide (4%) | 29.3 |

Polymerization

The polymerization was carried out as indicated in Example 2, except as follows: It was made under a nitrogen atmosphere to displace oxygen. The catalyst-activator and vinyl acetate addition was regulated to keep the vinyl acetate content within the range of 0.4 to 1.6%. The reactor temperature was regulated at 56° to 73° C. The time required for the polymerization was one hour and 40 minutes.

Characterization of emulsion

| | |
|---|---|
| Particle size: | |
|    Predominant spheres | 0.5 micron |
|    Range spheres | 0.2 to 3 microns |
|    Agglomerates | up to 30 microns |
| pH | 4.35 |
| Viscosity | 1130 cp. |
| Air-dried film | Clear |
| Redispersion | None |
| Number of oscillations—wet rubs | O. K. at 10,000+ |
| Per cent screen test | 0.04% |
| 6% solids dilution settling test | 0.5 cc. |

EXAMPLE 5

Materials

As indicated in Example 2, except $N_2$ atmosphere and

|   | Cc. |
|---|---|
| Zinc formaldehyde sulfoxylate (4%) | 26.0 |
| Hydrogen peroxide (4%) | 26.0 |

Polymerization

The polymerization was carried out as indicated in Example 4, except that the vinyl acetate monomer content was regulated at 10%, decreasing to 0.8% at the end of the reaction. The temperature of the reactor was 64° to 72° C. The polymerization time was one hour and forty-five minutes.

Characterization of emulsion

| | |
|---|---|
| Particle size: | |
|    Predominant spheres | 1.5 microns |
|    Range | 0.5 to 3 microns |
|    Agglomerates | up to 6 microns |
| pH | 4.5 |
| Viscosity | 760 cp. |
| Air-dried film | Slightly cloudy |
| Redispersion | Redisperses |
| Number of oscillations — wet rubs | Failed at 107 |
| Per cent screen test | 0.03% |
| 6% solids dilution settling test | 0.5 cc. |

EXAMPLE 6

Materials

As indicated in Example 1, except as follows:

|   |   |
|---|---|
| Sodium bicarbonate | none |
| Zinc formaldehyde sulfoxylate (4%) | 15.0 cc. |
| Hydrogen peroxide (4%) | 15.0 cc. |

Polymerization

The polymerization was carried out with the above indicated materials as in Example 1. The polymerization time was one hour and forty minutes.

Characterization

| | |
|---|---|
| pH | 4.5 |
| Viscosity | 720 cp. |
| Air-dried film | Slightly cloudy |
| Redispersion | None |
| Number of oscillations — wet rubs | O. K. at 10,000+ |
| Per cent screen test | 0.7% |
| 6% solids dilution settling test | 5.0 cc. |

EXAMPLE 7

Materials

As indicated in Example 1, except as follows:

| | |
|---|---|
| Sodium bicarbonate | 3.6 g. |
| Zinc formaldehyde sulfoxylate (4%) | 24.2 cc. |
| Hydrogen peroxide (4%) | 24.2 cc. |

Polymerization

The polymerization was carried out with the above indicated materials as in Example 1. The polymerization time was one hour and forty minutes.

Characterization

| | |
|---|---|
| pH | 4.77 |
| Viscosity | 360 cp. |
| Air-dried film | Slightly cloudy |
| Redispersion | None |
| Number of oscillations — wet rubs | O. K. at 10,000+ |
| Percent screen test | 0.046% |
| 6% solids dilution settling test | 0.5 cc. |

EXAMPLE 8

Materials

As indicated in Example 1, except as follows:

| | |
|---|---|
| Sodium bicarbonate | None |
| Na₂HPO₄ | 3.0 g. |
| Zinc formaldehyde sulfoxylate (4%) | 84 cc. |
| Hydrogen peroxide (4%) | 84 cc. |

Polymerization

The polymerization was carried out according to the procedure of Example 1, using the above materials.

The polymerization was slow with this system, requiring 147 minutes to complete it. The catalyst requirement was about five times that of Example 2. The temperature of the reactor was maintained at 80–87° C.

Characterization of emulsion

Particle size:

| | |
|---|---|
| Predominant spheres | 0.3 micron |
| Range | 0.2 to 3.0 microns |
| Agglomerates | up to ca. 20 microns |
| pH | 3.3 |
| Viscosity | 1660 cp. |
| Air-dried film | Clear |
| Redispersion | None |
| Number of oscillations — wet rubs | O. K. at 10,000+ |
| Percent screen test | 0.018% |

EXAMPLE 9

Materials

As indicated in Example 1, except as follows:

| | |
|---|---|
| Sodium bicarbonate | None |
| Acetic acid | As required to adjust pH initially to 4.0 |
| Zinc formaldehyde sulfoxylate (4%) | 22.5 cc. |
| Hydrogen peroxide (4%) | 22.5 cc. |

Polymerization

The polyvinyl alcohol was dissolved in the water by heating at 85–90° C. The pH was adjusted to 4.0 with glacial acetic acid. The polymerization was then carried out as described in Example 1, using the above materials. The polymerization time was about one hour and forty-five minutes. The reactor temperature was 85–91° C.

Characterization of emulsion

Particle size:

| | |
|---|---|
| Predominant spheres | 0.7 micron |
| Range | 0.5 to 1.0 micron |
| Agglomerates | up to ca. 20 microns |
| pH | 3.8 |
| Viscosity | >10,000 cp. |
| Air-dried film | Clear |
| Redispersion | Redisperses |
| Number of oscillations — wet rubs | Failed at 35 |
| Percent screen test | 0.35% |

EXAMPLE 10

Materials

| | |
|---|---|
| Water | 282 g. |
| Indicator starch | 18 g. |
| Sodium bicarbonate | 0.35 g. |
| Vinyl acetate | 230 g. |
| Zinc formaldehyde sulfoxylate (6%) | 12 cc. |
| Hydrogen peroxide (4%) | 12 cc. |

The indicator starch was a grade of starch used for analysis, which forms a clear solution in water when heated to 80° C.

Polymerization

The indicator starch and sodium bicarbonate were mixed with the water in a vessel fitted with an agitator and reflux condenser. The mixture was stirred and heated at 85° to 95° C. for about one hour. The vinyl acetate, zinc formaldehyde sulfoxylate and hydrogen peroxide were added to this well stirred mixture at a rate which would keep the monomer content below 3% and the polymerization under reflux at 84 to 90° C. The time required for the polymerization was 45 minutes. The polyvinyl acetate emulsion was then cooled to about 25° C. with mild stirring.

Characterization of emulsion

Particle size:

| | |
|---|---|
| Predominant spheres | 0.5 micron |
| Range | 0.2 to 3.0 microns |
| Agglomerates | Very few |
| pH | 2.85 |
| Viscosity | Low (estimated) |
| Air-dried film | Clear |
| Redispersion | None |
| 6% solids dilution settling test | 1.0 cc. |

EXAMPLE 11

Materials

| | |
|---|---|
| Water | 282 g. |
| "Clear-Flo" L starch | 11.3 g. |
| Sodium bicarbonate | 0.35 g. |
| Vinyl acetate | 161 g. |
| Zinc formaldehyde sulfoxylate (6%) | 14.5 cc. |
| Hydrogen peroxide (4%) | 14.5 cc. |

The "Clear-Flo" starch is a partially sulfonated starch which is insoluble in cold water but forms clear solutions on heating in water at 80° C.

Polymerization

The procedure indicated in Example 10 was used with the above materials for the polymerization. The polymerization time was 25 minutes. The reactor was mainly at 86 to 89° C. The vinyl acetate content of the finished emulsion was less than 0.2%.

*Characterization of emulsion*

Particle size:
- Predominant spheres_____ 0.2 micron
- Range_____ 0.1 to 0.5 micron
- Agglomerates_____ None pH_____ 3.45
Viscosity_____ Low (estimated)
Air-dried film_____ Excellent clarity
Redispersion_____ None
6% solids dilution settling test__ 0.1 cc.

EXAMPLE 12

*Materials*

Water _____ 282 g.
Partially hydrolyzed grade of polyvinyl alcohol _____ 18 g.
Vinyl acetate _____ 170 g.
Zinc formaldehyde sulfoxylate (6%) _____ 31 cc.
Hydrogen peroxide (4%) _____ 31 cc.

*Polymerization*

The vinyl acetate, zinc formaldehyde sulfoxylate and hydrogen peroxide were added to a prepared solution of the disperser maintained at ca. 84° to 86° C. by the method of the preceding examples, maintaining the monomer content below 3%. The polymerization time was 30 minutes.

*Characterization of emulsion*

The emulsion was pasty (viscosity > 10,000 cp.). A clear film was obtained by spreading the emulsion on a watch glass and drying in air at 25 to 30° C. When the dried film was covered with water and gently rubbed with the finger, it readily redispersed in the water. The emulsion was not otherwise tested.

EXAMPLE 13

*Materials*

Water _____ 320 g.
Hydroxy ethyl cellulose, "WS 500" from Carbide & Carbon Co. (viscosity 523 cp. in 5% solution @ 20° C.) _____ 10 g.
Vinyl acetate_____ 230 g.
Zinc formaldehyde sulfoxylate (6%) _____ 14 cc.
Hydrogen peroxide (4%) _____ 16 cc.

*Polymerization*

The vinyl acetate, zinc formaldehyde sulfoxylate and hydrogen peroxide were added to a prepared solution of the disperser and buffer at 87° to 90° C. by the method of the preceding examples. The rate of vinyl acetate addition was regulated to maintain monomer concentration below 3%. The time of polymerization was about 50 minutes.

*Characterization of emulsion*

Particle size:
- Predominant spheres _____ 0.1 micron
- Range _____ 0.1 to 0.3 micron
- Agglomerates _____ Few; up to ca. 9 microns pH _____ 3.43
Viscosity _____ 170 cp.
Air-dried film_____ Clear, slightly rough
Redispersion_____ None
Number of oscillations—
  wet rubs_____ O. K. at 10,000+
Per cent screen test_____ 0.3%
6% solids dilution settling test _____ 0.5 cc.

The polyvinyl alcohols suitable as emulsifiers or dispersing agents in practicing our invention are those which are made by reacting polyvinyl acetate with an alcohol or water until at least 98% of the acetate groups have been converted to hydroxyl groups. Such polyvinyl alcohols are herein and in the appended claims termed "completely hydrolyzed grade of polyvinyl alcohol." We prefer to use polyvinyl alcohols which are thus 99 to 100% saponified.

The above described completely hydrolyzed grade of polyvinyl alcohol as generally made is insoluble or only slightly soluble in cold water, i. e., at temperatures below 50° C.; and in order to prepare an aqueous solution thereof for the practice of this invention we usually stir a mixture of water and the polyvinyl alcohol at a temperature above 50° C. until a substantially clear solution is found. Preferably, we stir the mixture to disperse the polyvinyl alcohol (in finely divided form) in the water and heat the dispersion at 80 to 95° C. for about one hour, to obtain a clear solution. Such solution may be cooled to room temperature, without precipitation of dissolved polyvinyl alcohol.

Certain polyhydroxy polymeric film-forming substances other than the completely hydrolyzed grades of polyvinyl alcohol may also be used as dispersing agents in our process, for example, certain starches and hydroxy alkyl celluloses. To serve as a substitute for completely hydrolyzed grades of polyvinyl alcohol in this process, the polymeric material must contain hydroxyl groups in proportions equal to or greater than that of other functional groups (such as ether groups, ester groups, carboxyl, sulfonyl and the like) and must also have substantially the water solubility characteristics described above. That is, it must be substantially insoluble or only slightly soluble in water at temperatures below 50° C. but soluble when heated with water at temperatures at or above 50° C. (e. g., 70 to 100° C.), to form solutions. One example is any of the various known "soluble" starches, which must be heated to 70° or higher in contact with water to form aqueous solutions. Such soluble starch, suitable for our purpose, may be made, for example, by partially sulfonating starch, so that less than half of the hydroxyl group of the starch are sulfonated. Other forms of modified starch containing a preponderance of free hydroxyl groups and having the above solubility characteristics may be used as well.

The hydroxy alkyl celluloses (hydroxy alkyl cellulose ethers) which have the above described solubility characteristics, e. g., hydroxy ethyl cellulose, also may be used in place of the completely hydrolyzed grades of polyvinyl alcohol to practice our invention.

The concentration of dispersing agent in the polymerization reaction mixture will vary, depending on its dispersing power and the viscosity of its aqueous solution. For example, a completely hydrolyzed grade of polyvinyl alcohol, a 4% by weight aqueous solution of which has a viscosity less than 100 centipoises at 20° C., will be employed as a 4.5 to 6% by weight aqueous solution. Still higher concentrations, e. g., 6 to 10%, may be employed if desired. Other completely hydrolyzed grades of polyvinyl alcohol whose aqueous solutions have higher viscosities may be used in lower concentrations, e. g., around 2%. In general the concentrations of dispersing agent in the practice of our invention does not depart from conventional practice in emulsion polymerization of vinyl acetate, sufficient dispersing agent being employed to form a stable dispersion of the resulting polymer.

The catalyst preferably used in our process is what we term "activated peroxide type" polymerization catalyst, by which term we mean the combination of a peroxygen compound and a reducing agent, for example, a bisulfite, sulfinic acid, sulfurous acid, sulfoxylate or other sulfoxy compound having reducing properties. The peroxygen compound may be hydrogen peroxide, an organic peroxide such as benzoyl peroxide, acetyl peroxide or the like, an organic or inorganic peracid or a salt thereof, e. g., peracetic acid, perborates and persulfates. A preferred catalyst is the combination of hydrogen peroxide with a sulfoxylate, e. g., zinc formaldehyde sulfoxylate. Such activated peroxygen types of polymerization catalysts are well known in the art and are described, for example, in Brubaker et al. U. S. P. 2,462,354. In such combinations of a peroxygen compound and a reducing compound, we prefer to use a water soluble peroxygen compound. Also, we generally prefer to add the peroxygen compound and the reducing compound separately to the polymerization reaction mixture. While we prefer the above-mentioned activated peroxide type catalyst, our invention is not restricted thereto; but the various peroxygen type catalysts conventionally employed for vinyl acetate polymerization may be used in our process.

The amount of catalyst and the temperature of the reaction mixture during the polymerization are not particularly critical and may follow conventional procedures for the polymerization of vinyl acetate. We generally prefer to add the catalyst in small amounts simultaneously with the addition of the monomer, but such is not essential, so long as the catalyst concentration is maintained sufficiently high to cause polymerization.

In practicing our invention to produce stable polyvinyl acetate emulsions which form highly water-resistant films it is essential that:

(1) The dispersing agent be a completely hydrolyzed grade of polyvinyl alcohol as defined above or other polyhydroxy polymeric substance in which free hydroxyl groups are present in amount equal to or greater than other functional groups and which is soluble in water at a temperature above 50° C. but insoluble in water at temperatures below 50° C.

(2) The amount of monomeric vinyl acetate present in the reaction mixture does not exceed 5.0% of the weight of the water present when the polymer content of the emulsion is 20% by weight or less, and does not exceed 3.0% of the weight of the water when the polymer content is above 20% by weight; and (3) The initial pH of the polymerization reaction mixture must be above 4 and must be permitted to fall to a pH not higher than 6 before completion of the reaction.

(4) The polymerization is continued until the polymer content has reached at least 20% by weight but not more than about 40%.

If any one of the above four requirements is not met in the polymerization procedure, the resulting product will not be a stable dispersion which produces non-redispersible films on drying at temperatures not lower than 25° C. For example, if the dispersing agent is a partially hydrolyzed grade of polyvinyl alcohol, the resulting emulsion will not form water-resistant films, regardless of the type of catalyst used or monomer content during polymerization. If the monomer content of the reaction mixture initially exceeds 5% or exceeds 3% when the polymer content is above 20% during the polymerization reaction, the water resistance of films cast from the resulting product will be unsatisfactory. If the polymerization is carried on to a polymer concentration exceeding about 40% by weight, coagulation begins to occur, resulting in a relatively unstable and non-uniform dispersion.

Control of monomer content of the polymerization reaction mixture is an important and essential feature of our process. During the reaction, the monomer content, regulated by the rate of addition of monomer, must not exceed 5% by weight of the reaction mixture when the polymer content is 20% by weight or less and must not exceed 3% by weight when the polymer content exceeds 20%. Preferably, we begin the reaction with around 1 to 1.5% of vinyl acetate in the emulsion and maintain the vinyl acetate content at 1.5 to 3% during most of the reaction. By employing a nitrogen atmosphere to exclude air as described below, we may maintain the vinyl acetate monomer content at not over about 0.4%, which gives the best product at reasonably low catalyst consumption. If desired, the monomer content may be maintained as low as 0.1%. To control the monomer concentration, the vinyl acetate is added substantially at the rate of its polymerization and catalyst is added continuously or intermittently as required to maintain reaction.

It is desirable to exclude air from the reaction mixture, as molecular oxygen has an inhibitory effect on the polymerization. Preferably, the air is excluded by operating in a closed reactor equipped with a reflux condenser and maintaining an atmosphere of vinyl acetate vapor over the reaction mixture. Alternatively, the reactor free space may be filled with an oxygen-free, inert gas such as nitrogen.

In practicing our invention, for the best results the dispersing agent (e. g., the polyvinyl alcohol) should be substantially completely dissolved in the water before the vinyl acetate and polymerization catalyst are added. As most of the completely hydrolyzed grades of polyvinyl alcohol are insoluble in cold water, we generally heat and stir a mixture of the polyvinyl alcohol and water at 70 to 100° C. until substantially complete solution is obtained. The catalyst and vinyl acetate then may be added as described above.

It is essential that the pH of the polymerization reaction mixture initially be above 4 and we prefer an initial pH of around 6 to 8. To insure a reasonably high pH we generally prefer to add a mild alkaline buffer such as sodium bicarbonate, disodium phosphate, sodium acetate, or the like. If the mixture initially contains acetic acid, it may be neutralized by adding the above alkali or a stronger alkali such as sodium hydroxide, sodium carbonate or the like. As the polymerization proceeds, the pH of the reaction mixture generally falls, due to formation of acetic acid, caused by hydrolysis of part of the vinyl acetate monomer. Preferably, the initial pH is so adjusted (e. g., to pH of 6 to 8) so that the final pH is above 4. However a good product may be obtained at a final pH below 4, provided that during the greater part of the reaction the pH is above 4. When a mild alkaline buffer such as sodium bicarbonate or disodium phosphate is used to adjust the initial pH, we prefer to add the buffer to the water before dissolving the polyvinyl alcohol therein.

If the initial pH is below 4, the resulting emulsion produces water dispersible films. Low initial pH also tends to cause undue thickening of the emulsion, increase in particle size of the dispersed polymer, aggregation of particles and coagulation.

The polymerization temperature is not particularly critical and temperatures conventionally employed for polymerizing vinyl acetate with peroxide catalysts are suitable, e. g., from 50 to 90° C. We generally prefer to maintain the reaction mixture at reflux temperature, e. g., at 85 to 90° C. In operating at lower temperatures without refluxing, we prefer to maintain a nitrogen atmosphere in the reactor, to exclude air.

The emulsions prepared as described herein are aqueous dispersions of solid polyvinyl acetate having improved characteristics. Films made by drying these emulsions at 25° C. or higher are substantially insoluble (i. e., not redispersible) in water at any temperature. These emulsions are further characterized by unusually small particle size of the polyvinyl acetate, high stability, both in concentrated and diluted forms, and relative freedom from agglomerates. The emulsions are useful for a variety of purposes, particularly for coating solid surfaces, and as adhesives. For such purposes the emulsions may be used per se or in combination with other ingredients such as pigments, extenders, fillers, plasticizers, colorants and the like.

We claim:

1. The process which comprises dispersing vinyl acetate monomer in a 2 to 10% by weight aqueous solution of a hydrophilic dispersing agent which is a polyhydroxy, polymeric, film-forming substance substantially insoluble in water at temperatures below 50° C. but soluble in water at a temperature not lower than 50° C. to form a dispersion containing not more than 5% by weight of said monomer, subjecting said dispersion to polymerization in the presence of a peroxygen type catalyst, while dispersing therein further quantities of said monomer so as to maintain a monomer concentration not greater than 5% by weight when the polymer concentration is not over 20% by weight and not greater than 3% by weight when the polymer content has exceeded 20% by weight; continuing as above until the polymer content has reached 20 to 40% by weight and controlling the pH of the polymerization reaction mixture so that it is initially not less than 4 and finally not greater than 6, the concentration of said dispersing agent being sufficient to form a stable dispersion of the resulting polymer.

2. The process which comprises dispersing vinyl acetate monomer in a 2 to 10% by weight aqueous solution of a completely saponified grade of polyvinyl alcohol in concentration of said monomer equal to 0.1 to 3% by weight, subjecting the resulting dispersion to polymerization in the presence of peroxygen type polymerization catalyst and adding and dispersing therein further amounts of said monomer in such quantities that the monomer concentration never exceeds a certain value, depending upon the concentration of dispersed polymer, as follows: not over 5% when the polymer concentration is not over 20% by weight; not over 3% when the polymer concentration is more than 20% by weight; and continuing said addition of monomer until the resulting dispersion contains 30 to 40% by weight of polymer and controlling the pH of the polymerization reaction mixture so that it is initially not less than 4 and finally not greater than 6, the concentration of said polyvinyl alcohol being sufficient to form a stable dispersion of the resulting polymer.

3. The process according to claim 2 in which the polymerization catalyst is an activated peroxide type.

4. The process according to claim 3 in which the polymerization catalyst comprises hydrogen peroxide and a sulfoxylate, separately added to the reaction mixture.

5. The process according to claim 4 in which the monomer content is regulated not to exceed 3% by weight throughout the polymerization reaction.

6. The process according to claim 5 in which the aqueous solution of polyvinyl aclohol is prepared by dispersing and heating the polyvinyl alcohol in water containing sufficient alkaline salt to adjust the pH to above 4.

7. The process according to claim 6 in which the alkaline salt is sodium bicarbonate and the pH is adjusted to 6 to 8.

JOHN E. BRISTOL.
NORRIS TURNBULL.

REFERENCES CITED

The following references are of record in the file of this patent:

UNITED STATES PATENTS

| Number | Name | Date |
| --- | --- | --- |
| 2,227,163 | Starck et al. | Dec. 31, 1940 |
| 2,497,828 | Young | Feb. 14, 1950 |
| 2,508,341 | Wilson | May 16, 1950 |
| 2,535,189 | Benson et al. | Dec. 26, 1950 |